Oct. 23, 1956  H. M. RANSOM  2,767,583
PROTECTIVE DEVICE FOR A TANK CONTENTS GAUGING SYSTEM
Filed Feb. 15, 1955
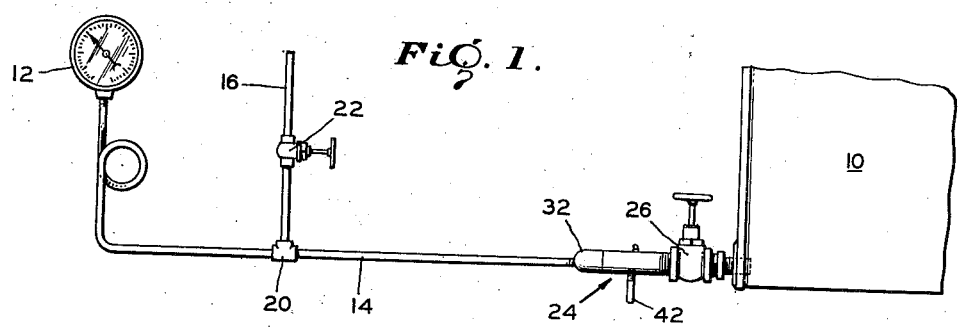
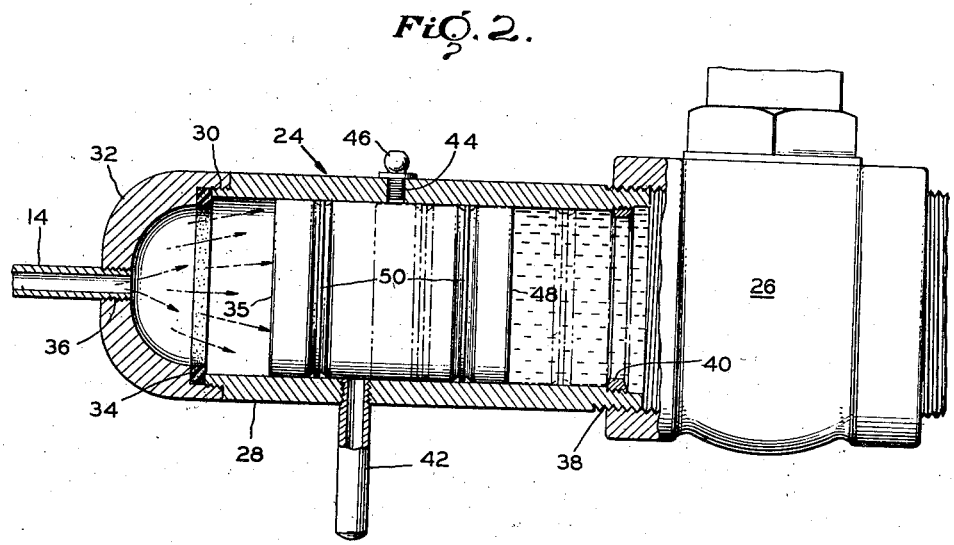
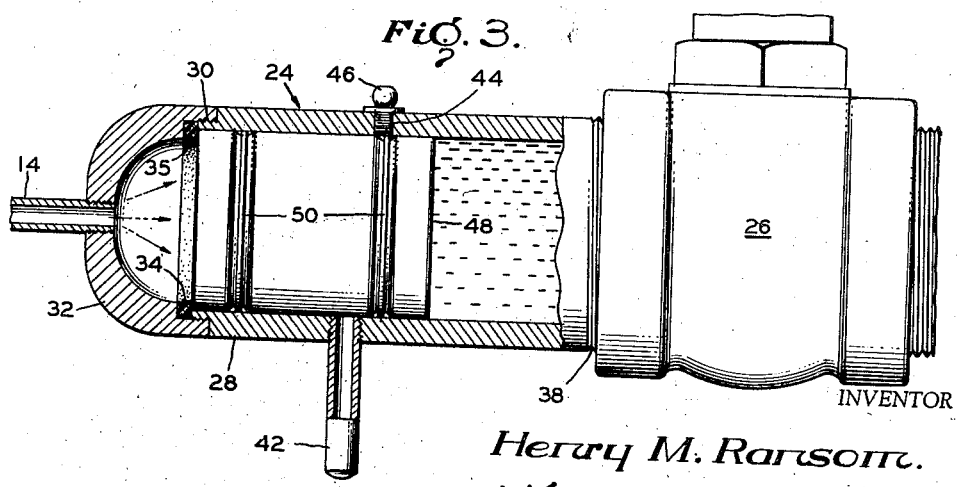
INVENTOR
Henry M. Ransom.
BY Gustave Miller
ATTORNEY

United States Patent Office 2,767,583
Patented Oct. 23, 1956

2,767,583
PROTECTIVE DEVICE FOR A TANK CONTENTS GAUGING SYSTEM

Henry Morgan Ransom, Mount Bethel, Pa., assignor of one-half to Joseph Copozzola, Roseto, Pa.

Application February 15, 1955, Serial No. 488,337

1 Claim. (Cl. 73—302)

This invention relates to an automatic protective device for the airline of any standard type of air pressure gauge of sufficient capacity to measure the contents of large tanks, or other types of liquid containers, either vented or sealed, regardless of their depth. An object of this invention is to provide an automatic protective device used in conjunction with a liquid tank which serves automatically to prevent escape of the liquid into the pressure gauge mechanism upon failure of the air pressure in the system, the pressure gauge being properly calibrated to measure the liquid contents of the particular tank to which it is attached, or of any other liquid of the same weight per gallon put in the same tank.

The present invention, briefly, comprises a protective device of the piston type that is inserted in a chamber between an air pressure inlet, connected to the pressure gauge which measures the contents of the tank on one end and a liquid pressure inlet, connected to the liquid tank, on the opposite end. The amount of air pressure required to balance the liquid pressure and thus measure the tank contents, is indicated on the gauge, in order to obtain an exact measurement of the pressure of the liquid in terms of its contents any leakage of air around the piston and into the liquid is prevented by an excess air outlet which is positioned between the liquid inlet and the air pressure inlet. This is of particular advantage when operating under pressure of the contents of the tank or when such a leakage of air would cause the creation of a noxious or combustible mixture.

The excess air outlet is provided in the form of a pipe or conduit situated on the gauge side of the center of the protective device chamber and in a position where it is always covered by the piston and lies between the piston rings when the pressure in the tank equals or exceeds the pressure in the gauge. When the gauge pressure exceeds the tank pressure, the excess air pressure leaks off through excess air outlet to equalize the air and liquid pressures on either end of the piston and thus causes the calibrated gauge to indicate the tank contents. In the event of an accidental or intentional reduction of the pressure in the air chamber, as when a break in the compressed air line occurs, the piston is automatically driven against a sealing gasket on the air pressure side, thereby acting to seal the air line leading to the gauge from entrance of the liquid. This is highly important, especially in the case where the liquid is a crude oil or a corrosive chemical substance which might damage the gauge mechanism.

It is therefore, one object of the present invention to provide a protective device for an air gauge connected to a liquid tank which is adapted automatically to close the line leading to the gauge in all cases of a failure of air pressure.

Another object of the present invention is to provide a protective device for an air gauge system connected to a liquid tank in the form of a piston valve, wherein all leakage of air into the liquid chamber is prevented.

Another object of the present invention is to provide a protective device for an air gauge connected to a liquid tank wherein, except for a failure of air pressure, a true balance may be arrived at between the air and liquid pressures to properly gauge the contents of the tank.

Other objects of the present invention are to provide an improved protective device, of the character described, that is easily and economically produced, which is sturdy in construction, and which is highly efficient in operation.

With the above and related objects in view, the present invention consists in the details of construction and combination of parts, as will be more fully understood from the following description, when read in conjunction with the accompanying drawing in which:

Fig. 1 is a side elevational view of a tank gauge fluid circuit wherein a protective device embodying the present invention is installed.

Fig. 2 is an enlarged, longitudinal, sectional view of a protective device embodying the present invention, and showing the protective device in balanced position.

Fig. 3 is a sectional view similar to Fig. 2, but showing the protective piston in safety position after a reduction in air pressure has occurred.

Referring now in greater detail to the drawing wherein similar reference characters refer to similar parts, there is shown in Fig. 1 a fragmentary bottom portion of a liquid tank 10, holding oil, acid or other liquid, the tank being connected to a pressure gauge 12 properly calibrated in terms of the tank contents through an air line 14. A conduit 16, leading from a source of air pressure, is connected into the air line 14 by a T-coupling 20. A cut-off valve 22 is interposed in the air pressure conduit for the purpose of stopping the flow of compressed air except when in the act of measuring the contents of the tank. Between the coupling 20 and the tank, there is interposed in the line 14 a protective device 24, which is connected to the tank through a gate valve or the like, indicated at 26. This gate valve 26 is provided as a cut-off valve for the liquid.

The protective device 24 comprises a piston chamber 28, in the form of a cylindrical housing. At one end, the chamber is provided with a threaded nipple 30 upon which is threadedly mounted a cap 32. Mounted between an internal shoulder on the cap 32 and the end of the nipple 30 is a rubber gasket 34 forming a seat for the end 35 of the piston 48. A threaded opening 36 is provided in the cap and is adapted to act as a threaded connection for the air line 14. The opposite end of the chamber 24 is also provided with a thread 38 which is adapted to be threadedly connected to the gate valve 26. A piston stop 40 is provided at this end.

An excess air outlet pipe 42 extends from the approximate center of chamber and opposite thereto is provided a threaded lubricating opening 44. The lubricating opening is adapted to be closed by a threaded nipple 46. A piston 48 is axially movable in chamber 24 between the seat 34 and stop 40. However, when the air pressure is adjusted to just balance the liquid pressure, the piston remains in the center position, as shown in Fig. 2 and the gauge then properly indicates the tank contents.

The piston 48 is provided with piston rings 50 axially spaced from each other to prevent leakage of compressed air around the piston and into the liquid. This not only results in an inaccurate gauge reading because of the greater amount of air used than is really necessary to balance the liquid, but also results in a generally undesirable admixture of the air and liquid. In some cases, such as where the mixture is highly combustible or noxious, this is particularly undesirable. By means of this outlet, the excess air is caused to be bled through the outlet pipe until the piston reaches the balanced position and the gauge gives a correct indication of the tank contents. The outlet 42 is placed in such a position that even when the piston is seated against the gasket 34, the excess air outlet is still positioned between the piston rings 50. This provides a sealing effect against both air leakage into the liquid and liquid leakage through the excess air outlet.

In operation, tank bottom gate valve 26 and pressure supply line cut-off valve 22 may normally be kept closed. When desiring to measure the contents of the tank, both gate valve 26 and cut-off valve 22 are opened. Open gate valve 26 permits the pressure caused by the contents of the tank to act against the tank end of piston 48 pushing the piston against resilient seat or gasket 34, while the piston rings seal off the air excess outlet pipe 42. Open cut-off valve 22 permits pressure from the air pressure supply to build up in the line between the gauge 12 and the resilient seat end of the piston chamber until the pressure exceeds the pressure at the tank end of the piston, causing the piston to move toward the tank end and open the outlet pipe 42 to the gauge end of the chamber, as will become apparent from the air pressure escaping from the outlet. Then, the pressure cut-off valve 22 is closed, and the pressure on the gauge end of the chamber will continue to bleed off through the outlet pipe 42 until it balances the pressure from the bottom of the tank, whereupon the piston will move back to cut off the escape of air from the outlet, so that the pressure in the gauge line is the same as the pressure in the bottom of the tank, and then the reading on the gauge, properly calibrated, will indicate the true contents of the tank.

It should be noted that even though the invention has been illustrated as used in conjunction with a compressed air operated gauge means, the device is equally as well adapted for use in conjunction with any fluid operated gauge, including both gases and liquids, and in fact is adaptable for use with various types of fluid systems where gauges are not used at all.

Although the present invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A protective device for a tank contents gauging system comprising a pressure gauge calibrated in terms of tank contents, a pressure supply line to said pressure gauge, pressure cut-off means in said pressure line, a line connecting said pressure gauge and supply line to the bottom of the tank to be measured, said protective device interposed in said latter line between its gauge and pressure supply line and the tank bottom comprising a piston chamber connected at one end to said line and at its other end to said tank bottom, a piston reciprocable in said chamber, a resilient seat against which the piston seats at the pressure line end of said chamber, a piston stop at the tank end of said chamber, said piston having a pair of axially spaced piston sealing rings, an air pressure outlet in one side of said chamber on the line end side of the center of said chamber, said pressure outlet being spaced from said piston stop a distance at least equal to the length of said piston whereby said pressure line and said outlet are in communication when said piston is against said piston stop, and being spaced from said resilient seat a distance equal to the distance from the resilient seat end of the piston to an intermediate position of said piston between its piston rings, whereby when said piston is seated against said resilient seat said piston continues to seal fluid from said tank end thereof against reaching said air outlet.

References Cited in the file of this patent

UNITED STATES PATENTS

| Number | Name | Date |
|---|---|---|
| 1,101,920 | Garbutt | June 30, 1914 |
| 1,676,999 | Mobley | July 10, 1928 |
| 1,841,337 | Roessler | Jan. 12, 1932 |
| 2,418,614 | Annin | Apr. 8, 1947 |